United States Patent
Hong

(10) Patent No.: US 9,504,992 B2
(45) Date of Patent: Nov. 29, 2016

(54) SOLID ACID CATALYST FOR PREPARING A MONOSACCHARIDE AND METHOD OF PREPARING A MONOSACCHARIDE FROM SEAWEED USING THE SAME

(71) Applicant: HYUNDAI MOTOR COMPANY, Seoul (KR)

(72) Inventor: Chae Hwan Hong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/689,855

(22) Filed: Apr. 17, 2015

(65) Prior Publication Data

US 2016/0108074 A1  Apr. 21, 2016

(30) Foreign Application Priority Data

Oct. 17, 2014 (KR) .................. 10-2014-0141179

(51) Int. Cl.
| | |
|---|---|
| C07H 3/02 | (2006.01) |
| B01J 27/02 | (2006.01) |
| B01J 37/08 | (2006.01) |
| B01J 37/06 | (2006.01) |
| B01J 21/18 | (2006.01) |
| B01J 31/10 | (2006.01) |
| B01J 35/00 | (2006.01) |

(52) U.S. Cl.
CPC .............. *B01J 27/02* (2013.01); *B01J 37/084* (2013.01); *B01J 21/18* (2013.01); *B01J 31/10* (2013.01); *B01J 35/0013* (2013.01); *B01J 37/06* (2013.01)

(58) Field of Classification Search
CPC ...... B01J 27/053; B01J 21/08; B01J 37/084; B01J 35/023; C07H 3/02

USPC .......................... 502/180; 127/34, 42–44, 50
See application file for complete search history.

(56) References Cited

U.S. PATENT DOCUMENTS

| | | | | |
|---|---|---|---|---|
| 1,556,039 A | * | 10/1925 | Shilstone | B01J 20/20 127/55 |
| 4,619,911 A | * | 10/1986 | Goodwin | B01J 20/10 252/62 |
| 5,858,911 A | * | 1/1999 | Wellen | C04B 12/04 423/445 R |

(Continued)

FOREIGN PATENT DOCUMENTS

| | | | |
|---|---|---|---|
| CN | 102029188 A | * | 4/2011 |
| JP | 2011-131180 | * | 7/2011 |

(Continued)

OTHER PUBLICATIONS

"Comparison of products from the pyrolysis and catalytic pyrolysis of rice husks," Paul T. Williams et al. Energy 25 (2000), pp. 493-513.*

(Continued)

*Primary Examiner* — Patricia L Hailey
(74) *Attorney, Agent, or Firm* — McDermott Will & Emery LLP

(57) ABSTRACT

A solid acid catalyst for preparing a monosaccharide by degrading agarose includes a particle having a carbonized chaff and a sulfonyl group which is chemically bound on a surface of the carbonized chaff. A method of preparing the monosaccharides from seaweed using the solid acid catalyst includes reacting agarose with the solid acid catalyst, thereby preparing the monosaccharide by using an economical and efficient process.

16 Claims, 1 Drawing Sheet

(56) References Cited

U.S. PATENT DOCUMENTS

| | | | | |
|---|---|---|---|---|
| 6,114,280 | A | * | 9/2000 | Stephens ............... C01B 31/081 423/445 R |
| 6,136,749 | A | * | 10/2000 | Gadkaree ........... B01D 53/8665 502/180 |
| 2009/0176979 | A1 | * | 7/2009 | Hara ..................... B01J 21/18 536/56 |
| 2010/0291167 | A1 | * | 11/2010 | Iida ......................... A61K 8/19 424/401 |
| 2013/0023405 | A1 | * | 1/2013 | Hitomi ................... B01J 21/18 502/180 |
| 2014/0027677 | A1 | * | 1/2014 | Lipka ..................... H01B 1/24 252/502 |

FOREIGN PATENT DOCUMENTS

| | | |
|---|---|---|
| JP | 5524602 B2 | 6/2014 |
| KR | 10-2009-0025221 A | 3/2009 |
| KR | 10-2010-096408 * | 9/2010 |
| KR | 10-2010-0096408 A | 9/2010 |
| KR | 10-2012-0021878 A | 3/2012 |
| KR | 10-2012-0094367 A | 8/2012 |
| KR | 10-1176775 B1 | 8/2012 |
| KR | 10-11767750000 * | 8/2012 |
| KR | 10-2012-0021878 * | 9/2012 |
| KR | 10-2013-086855 * | 8/2013 |
| KR | 10-2013-0086855 A | 8/2013 |

OTHER PUBLICATIONS

Okamura, M. et al., "Acid-Catalyzed Reactions on Flexible Polycyclic Aromatic Carbon in Amorphous Carbon", Chem. Mater., 2006, 18, 3039-3045.

Sung, Y.J. et al., "Chemical Composition of Rice Hull and Morphological Properties of Rice Hull Fibers", Journal of Korea TAPPI, 2009, 41, 3, 23-28. (With English Abstract).

* cited by examiner

Separating, drying, and pulverizing
of sea weed
Extracting agar and agarose
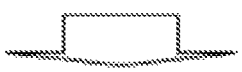
Contacting and reacting agarose
with solid acid catalyst
Production of monosaccharide

SOLID ACID CATALYST FOR PREPARING A MONOSACCHARIDE AND METHOD OF PREPARING A MONOSACCHARIDE FROM SEAWEED USING THE SAME

CROSS-REFERENCE TO RELATED APPLICATION

This application claims the benefit of priority to Korean Patent Application No. 10-2014-0141179 filed in the Korean Intellectual Property Office on Oct. 17, 2014, the entire content of which is incorporated herein by reference.

TECHNICAL FIELD

The present disclosure relates to a solid acid catalyst for preparing a monosaccharide, a method of preparing a monosaccharide from seaweed using the same, and a monosaccharide prepared therefrom.

BACKGROUND

When preparing a biomaterial, a monosaccharide is initially used. Biomass, which is a raw material for preparing the monosaccharide, is largely classified into carbohydrate (sugar cane, sugar beet, and the like), starch (corn, potato, sweet potato, and the like), lignocellulose (wood, rice straw, waste paper, and the like). The monosaccharide is directly prepared from the carbohydrate by performing a pre-treatment process and subsequent processes. The monosaccharide is prepared using the starch and the lignocellulose as a fuel by performing an appropriate pre-treatment process and a saccharification process.

When starch is used as an energy source, problems in supply and demand of its raw material may occur. Further, growing corn in order to obtain the starch requires a significantly large amount of agricultural pesticides and nitrogen fertilizer, thus severely damaging soil and discharging carbon dioxide and the like. The lignocellulose has secured stability in supply and demand of raw material since it is not useful for food. However, the processing cost of the lignocellulose is greater due to the pre-treatment process of removing lignin and strong acids. Further, strong bases are used in a saccharification process due to a crystalline structure in which hydrogen bonds are formed which is a characteristic of the lignocellulose cellulose substrates, such that either saccharification yield is low or by-products occur. Therefore, seaweed has recently received attention as biomass. Seaweed is largely classified into macroalgae and microalgae. Macroalgae includes red algae, brown algae, green algae, and the like, and microalgae includes chlorella, spirulina, and the like. Seaweed has remarkably excellent growth as compared to other biomasses (harvest 4 to 6 times in one year in a subtropical region), has a large available cultivation area, and high-priced resources such as freshwater, land, fertilizer, and the like, are used in small amounts. As compared to a land plant, structural characteristics of the seaweed having soft tissue allow the pre-treatment process to be easy, which is advantageous for utilization as an industrial biomass.

A process of preparing the monosaccharide by using seaweed as a raw material may be divided into the pre-treatment process in which a polysaccharide is prepared from the seaweed and the saccharification process in which the monosaccharide is prepared. In the saccharification process according to the related art, the monosaccharide is prepared by a degradation enzyme or chemical treatment on polysaccharide materials extracted from original seaweed or sea seeds. For example, galactose is extracted and prepared by the pre-treatment process from red algae from marine resources and the saccharification process in which the monosaccharide is prepared.

In order to prepare an agarose, an agar needs to be degraded, wherein the agar is a complex polysaccharide having a high density, from the red algae, such as ceylon moss to be utilized for various applications, such as food materials, microorganism culture mediums, cosmetics, molecular biological studies, and the like. The main components of the agar include agarose and agaropectin, which are generally contained at a ratio of about 7:3.

Existing technologies of preparing the monosaccharide use acidic chemical materials and enzymes to prepare the final monosaccharide, and therefore, development of a simple and a low-priced technology has been demanded.

SUMMARY

The present disclosure has been made in an effort to provide a method of preparing a monosaccharide from seaweed by using an economical and efficient process.

The present disclosure provides a solid acid catalyst for preparing a monosaccharide by degrading agarose, and a method of preparing a monosaccharide using the same.

Further, the present disclosure provides a method of preparing a monosaccharide from seaweed, including preparing a monosaccharide by reacting agarose with a solid acid catalyst.

In addition, the present disclosure provides a method of preparing a monosaccharide from seaweed, including treating agar from seaweed with an alkaline aqueous solution to obtain agar, obtaining agarose from agar by using a solvent selected from the group consisting of an organosulfur solvent and dimethylformamide, and preparing a monosaccharide by reacting the agarose with a solid acid catalyst.

Moreover, the present disclosure provides a monosaccharide obtained by the method of preparing the monosaccharide from seaweed.

According to an exemplary embodiment of the present inventive concept, a solid acid catalyst for preparing a monosaccharide by degrading agarose includes a particle having a carbonized chaff with a sulfonyl group chemically bound on a surface of carbonized chaff.

The solid acid catalyst is cheaper than sulfuric acid in liquid form, is re-usable after reaction and recovery, and can be used at a wide range of reaction temperatures. Further, there is no need of additional separate processes after the process.

According to another exemplary embodiment of the present inventive concept, a method of preparing a monosaccharide from seaweed includes obtaining the monosaccharide by degrading agarose using the solid acid catalyst.

The method of preparing the monosaccharide from the seaweed according to the present disclosure has the same level of a production amount of the monosaccharide as compared to a saccharification process using an enzyme treatment method according to the related art. However, with the method of preparing the monosaccharide from the seaweed according to the present disclosure, the monosaccharide is economically prepared without using high-priced enzymes thereby decreasing manufacturing cost, by-products occurrence may be prevented, and the monosaccharide may be economically prepared.

BRIEF DESCRIPTION OF DRAWING

The FIGURE schematically illustrates a preparation process using red algae powder according to an exemplary embodiment of the present inventive concept.

DETAILED DESCRIPTION

Hereinafter, the present disclosure will be described in more detail.

An exemplary embodiment of the present inventive concept relates to a solid acid catalyst for preparing a monosaccharide by degrading agarose. The solid acid catalyst includes a sulfonyl group chemically bound to a carbonized chaff by treating the carbonized chaff with a sulfonic acid.

The solid acid catalyst of the present disclosure refers to a reaction catalyst providing a catalytic action based on acidity of a surface of the catalyst. Therefore, the catalytic action is performed according to a cationic ion mechanism, and a carbonium cationic ion or an oxonium ion can be used as an intermediate. Solid acid catalysts may include various materials such as zeolite, silica-alumina, and the like, but the solid acid catalyst according to an embodiment of the present disclosure is prepared by reacting a porous silica with a chlorosulfonic acid, in which the porous silica is obtained by carbonization of rice chaff.

The step of preparing the solid acid catalyst includes carbonizing the rice chaff in a heating furnace at a temperature of about 550 to 700° C. for 3 to 5 hours. The carbonized chaff is immersed in an aqueous sodium hydroxide solution to form a sodium-silicate bond. The sulfonyl group is bound to the carbonized chaff by treating the product with a chlorosulfonic acid to replace sodium. The obtained product is treated with an acid solution to adjust the pH to be 3 to 4, to prepare solid acid catalyst particles.

In addition, the method of preparing the solid acid may be performed by preparing particles, and then additionally separating, washing, and drying the particles to obtain the solid acid as a particle.

The aqueous sodium hydroxide solution may have a concentration of 30 w/v to 70 w/v, and reaction time may be 30 mins to 90 mins. A volume ratio of the sodium hydroxide aqueous solution to a weight of the carbonized material may be 0.01 to 0.1 g/mL to efficiently produce the sodium-silicate.

The chlorosulfonic acid may be added until the pH of the solution becomes about 7. The chlorosulfonic acid can introduce the sulfonyl group on a surface of the solid acid catalyst by replacing sodium in the sodium-silicate.

The step of preparing the particles may be performed by adding an acid, for example nitric acid at a pH range of 3 to 4. When the step of preparing the particles is performed outside of the range, the final product may have a very low acidity and may not form the particles.

The solid acid catalyst according to the present disclosure may be used for preparing the monosaccharide from the agarose. The method of preparing the monosaccharide using the same is described in detail below.

According to another exemplary embodiment of the present inventive concept, a method of preparing a monosaccharide from the seaweed using the solid acid catalyst includes reacting the agarose with the solid acid catalyst to prepare the monosaccharide.

The method of preparing the monosaccharide may further include obtaining agar by treating the seaweed with an alkaline aqueous solution and obtaining agarose from the agar, before the step of preparing the monosaccharide. Hereinafter, each step is described in detail.

Preparing a Monosaccharide by Reaction of Agarose and Solid Acid Catalyst

According to an exemplary embodiment of the present inventive concept, a method of preparing a monosaccharide from agarose includes contacting a solid acid catalyst with agarose dissolved in an aqueous solution. For example, the agarose solution is mixed with the aqueous solution into which the solid acid catalyst is injected to undergo a chemical reaction. The solid acid catalyst may be prepared by a solid acid solution in which a solid acid is added at an amount of 10 to 40 weight/volume (w/v) % based on the total amount of water and the solid acid.

Specifically, the step of mixing the agarose may be performed in a reactor at a temperature range of 80 to 120° C. A weight ratio of the agarose and the solid acid catalyst (agarose: solid acid catalyst) may be 1:1 to 1:5, or 1:1 to 1:4. The monosaccharide may be prepared by injecting the solid acid catalyst so that a ratio of the solid acid catalyst and the aqueous solution under the above-described condition is 0.1 to 0.4 g/mL and by maintaining the solid acid catalyst for 3 to 5 hours within the temperature range. The amount of the agarose and the aqueous solution to be used, the reaction temperature, and the reaction time may be determined in consideration of a preparation efficiency of the monosaccharide.

A raw material of the solid acid catalyst according to the present disclosure may be commercially available agarose or obtained from the agar or may be agarose obtained by treating the seaweed with an aqueous alkaline solution to obtain the agar and by reacting the agar with the solvent selected from the group consisting of organosulfur solvent and dimethylformamide.

Obtaining of Agar by Treating Seaweed with Aqueous Alkaline Solution

The seaweed in the present disclosure may include all green algae, brown algae, red algae, and the like. For example, the seaweed may include at least one selected from the group consisting of ceylon moss, sea string, glue plant, and laver. The red algae include polysaccharide in an amount of about 40 to 75%, and the polysaccharide includes cellulose, xylan, mannan, agar, carrageenan, and the like. The agar is galactan which is a complex polysaccharide and consists of two kinds of polysaccharides, that is, agarose and agaropectin. The agarose is a linear polymer including two monosaccharides, D-galactose and 3,6-anhydro-L-galactopyranose, as repeating units. The agarose may be obtained by removing other polysaccharides, for example, agaropectin, from the general agar obtained from the seaweed.

The seaweed in the present disclosure may be fresh seaweed or may be seaweed that is washed with fresh water and dried the seaweed. The seaweed may be dried at a temperature of 15 to 25° C., for a drying time of 10 to 60 hours in some embodiments or 25 to 40 hours in other embodiments. However, the present disclosure is not specifically limited thereto. The drying method may include general drying methods of seaweed.

In addition, the seaweed or the dried material may be treated with the aqueous alkaline solution. A pulverized material having a predetermined particle size may be firstly prepared and then the prepared material is treated with the aqueous alkaline solution in view of the yield of the agar and the reaction time consumed for treatment. The fresh seaweed or the dried material may be pulverized by a ball mill pulverizer or a general pulverizer, and the pulverized material may have a particle size of 100 to 300 micrometers.

When the particle size is excessively small, the material may function as impurities in an extraction process, and when the particle size is excessively large, efficiency of the extraction process may be deteriorated.

The step of obtaining the agar from the seaweed according to the present disclosure may be performed by hydrolysis of the seaweed or the pulverized material using the aqueous alkaline solution. The aqueous alkaline solution may preferably have a range of pH 7.5 to 9.5. When the pH of the aqueous alkaline solution is less than 7.5, extraction efficiency may be deteriorated, and when the pH of the aqueous alkaline solution is more than 9.5, the seaweed may be unnecessarily degraded so that by-products are increased.

Alkali materials used for preparing the aqueous alkaline solution may include sodium hydroxide, calcium hydroxide, potassium hydroxide, and the like, and are not specifically limited as long as a pH range of the aqueous solution is capable of being adjusted to be pH 7.5 to 9.5.

The step of treating the seaweed with the alkaline aqueous solution may be performed at a high temperature range of 95 to 130° C. When the processing temperature is less than 95° C., the extraction efficiency may be deteriorated, and when the processing temperature is 130° C. or more, unnecessary by-products may occur. The processing time may be 30 to 80 mins in consideration of the extraction efficiency.

The seaweed or pulverized materials thereof, and the alkaline aqueous solution may be used in an amount of 0.01 to 0.04 g/mL (seaweed powder is used in an amount of 2 to 4 g based on 100 mL of the alkaline aqueous solution), and the amount is determined in consideration of economic feasibility of the preparation process and the extraction efficiency of the agar.

Products obtained by treating the seaweed with the aqueous alkaline solution according to the present disclosure may include a solid component and a viscous liquid component. The viscous liquid component may be separated by various solid-liquid separation methods, for example, centrifugation, filtration, and the like, to obtain the agar.

Obtaining of Agarose by Using Solvent from Agar

According to an exemplary embodiment of the present inventive concept, the agarose is obtained by reacting the agar with the solvent selected from the group consisting of organosulfur solvent and dimethylformamide.

Suitable solvents for the step of preparing the agarose may include dimethylsulfoxide (DMSO) and/or dimethylformamide, but the present disclosure is not limited thereto.

The agar and the solvent may be used at a ratio of an agar weight to a solvent volume ranging from 1:2 to 1:5.

When the amount of the solvent to be used is small, an extraction efficiency may be decreased. Even through a large amount of solvent is used, an effect of increasing the extraction may not be sufficient, and the amount of acetone used in a subsequent process may be increased.

The agar and the organosulfur solvent and/or dimethylformamide according to the present disclosure may react at a reaction temperature range of 50 to 100° C. for a reaction time of 0.5 to 5 hours.

After the agar is treated with the organosulfur solvent and/or dimethylformamide, a supernatant may be recovered. The recovered supernatant may be treated with acetone to precipitate the agarose, and the precipitated agarose may be easily separated by a solid-liquid separation method, for example, centrifugation, filtration, and the like. In order to precipitate or solidify the agarose, the supernatant needs to be slowly injected into the acetone to prepare the agarose obtained as precipitation. The acetone which is added to the recovered supernatant may be used in an amount 1 to 5 times the volume of the supernatant.

Hereinafter, the present disclosure is described in detail with reference to examples. The following examples are provided for merely exemplifying the present inventive concept, and therefore, the scope of the present disclosure is not limited to the following examples.

Example 1

Preparation of Solid Acid Catalyst

Rice chaff was carbonized in a heating furnace at a temperature of 600° C. for 3 hours. Then, the carbonized chaff was immersed in an aqueous sodium hydroxide solution having a concentration of 50%, and maintained for about 30 mins. A ratio between a mass of the carbonized chaff and a volume of the sodium hydroxide aqueous solution was 0.03 g/mL (carbonized material: 3 g, sodium hydroxide aqueous solution: 100 mL).

Then, chlorosulfonic acid was injected into the obtained solution until the pH reaches 7, and nitric acid was injected thereinto until a final solution has a pH of 4, to thereby obtain particles. The obtained particles were subjected to centrifugation, and recovered particles were washed with acetone several times and dried to obtain a solid acid catalyst in a particle form using the carbonized chaff. The solid acid catalyst was formed in a particle form having a particle size of 100 to 500 nm.

Example 2

Preparation of a Monosaccharide Using a Solid Acid Catalyst

A dried raw sea string was pulverized by a pulverizer (Shreco Company, Korea) to prepare a pulverized sea string having a particle size of 100 micrometers.

An alkaline aqueous solution having a pH of 9 was prepared by adding 1N sodium hydroxide solution to water. 4 g of the pulverized sea string was injected into 200 mL of the alkaline aqueous solution so as to have a concentration of 0.02 g/mL, and maintained for 60 mins while stirring at a temperature of 100° C. A solid component and a viscous liquid component were separated from the mixture to obtain agar.

The viscous agar, which is the separated liquid component, was injected into dimethylsulfoxide (Daejung Chemicals & Metals Co. Ltd., Korea) having a volume 3 times larger than a volume of the liquid component and stirred (a volume of the viscous agar liquid component: about 100 mL, DMSO: 300 mL). The temperature was adjusted to be 80° C. The mixture was maintained for about 1 hour in the above-described state to obtain 300 mL of a supernatant, and acetone having a volume of 900 mL, 3 times larger than the volume of the supernatant, was slowly added dropwise to the supernatant to obtain 1 g of agarose as a white precipitate.

10 g of white precipitate was injected into 100 mL of aqueous solution into which 20 g of the solid acid according to Example 1 was injected, and maintained at a temperature of 120° C. for 2 hours. After the reaction time elapsed, the supernatant was extracted, and the monosaccharide was analyzed by a DNS reducing sugar analysis method. As a result of the analysis, 2 g of monosaccharide with respect to 4 g of the obtained agarose was obtained, and yield of the monosaccharide with respect to raw agarose was 50%.

According to the DNS reducing sugar analysis method, DNS (3,5-dinitrosalicylic acid) was reduced by reaction with the reducing sugar to be 3-amino-5-nitrosalicylic acid (reddish brown color), and a concentration of the reddish brown color was measured as absorbance by a spectrophotometer to obtain a concentration of the reducing sugar.

In addition, as a result obtained by measuring the amount of the acid component remaining in the saccharification liquid after the saccharification process, the saccharification liquid had a pH of 7, which confirmed that loose acid component was not included in the solution after the saccharification process.

Example 3

Preparation of a Monosaccharide Using Ceylon Moss and Glue Plant

Agarose was prepared by the same method as Example 2 except for using pulverized Ceylon moss and glue plant having a particle size of 150 micrometers, instead of using sea string as a raw material. As a result, 4 g of the agarose was obtained from the seaweed powder.

10 g of white precipitate was injected into 100 mL of aqueous solution into which 20 g of the solid acid according to Example 1 was injected, and maintained at a temperature of 120° C. for 2 hours. After the reaction time elapsed, the supernatant was extracted and analyzed by a DNS sugar analysis method. As an analysis result of the obtained product, 2 g of monosaccharide with respect to 4 g of the agarose was obtained at a yield of 50%.

Example 4

Preparation of a Monosaccharide Using Ceylon Moss and Glue Plant

Agarose was prepared by the same method as Example 3 except for changing a particle size of the pulverized Ceylon moss and glue plant used as a raw material to 200 micrometers, instead of the 150 micrometer particle size of Example 3. 4 g of the agarose was obtained from the seaweed powder.

10 g of white precipitate was injected into 100 mL of aqueous solution into which 20 g of the solid acid according to Example 1 was injected, and maintained at a temperature of 120° C. for 2 hours. After the reaction time elapsed, the supernatant was extracted and analyzed by a DNS sugar analysis method. As an analysis result of the obtained product, 2 g of monosaccharide with respect to 4 g of the agarose was obtained at yield of 50%.

Example 5

Preparation of a Monosaccharide Using Solid Acid Catalyst

Agarose and a monosaccharide were prepared by the same method as Example 2 except for dimethylformamide was used, instead of dimethylsulfoxide solvent used in the agarose preparation of Example 2.

As an analysis result of the obtained product, yield of the monosaccharide with respect to 4 g of the agarose obtained from the seaweed was 51%.

Example 6

Preparation of a Monosaccharide Using Solid Acid Catalyst

Agarose and a monosaccharide were prepared by the same method as Example 2 except for using 30 g of the solid acid catalyst and 10 g of the agarose in a step of contacting and reacting the agarose with the solid acid catalyst in Example 2.

As an analysis result of the obtained product, yield of the monosaccharide with respect to 4 g of the agarose obtained from the seaweed was 51%.

Comparative Example 1

Preparation of a Monosaccharide Using Hydrochloric Acid Aqueous Solution

Agarose as a white precipitate was prepared by the same method as Example 2. Then, 10 g of the prepared agarose precipitate was injected into 100 mL of 0.1N hydrochloric acid (HCl) aqueous solution (pH=2) instead of using the solid acid in the monosaccharide preparation using the agarose of Example 2, and maintained at a temperature of 120° C. for 2 hours.

After the reaction time elapsed, the supernatant was extracted, and the monosaccharide was analyzed by a DNS reducing sugar analysis method, which is the same method as Example 2. As a result, 1.5 g of monosaccharide with respect to 4 g of the agarose was obtained at a yield of 38%.

In addition, as a result obtained by analyzing an amount of the acid component remaining in the monosaccharide preparation by a pH meter, the pH was 3, which confirmed that the acid component was included in the solution.

Comparative Example 2

Preparation of a Monosaccharide Using Aqueous Sulfuric Acid Solution Catalyst

Agarose, as a white precipitate, was prepared by the same method as Example 2. Then, 10 g of the prepared agarose precipitate was injected into 100 mL of 0.1N sulfuric acid ($H_2SO_4$) aqueous solution instead of using the solid acid in the monosaccharide preparation using the agarose of Example 2, and maintained at a temperature of 120° C. for 2 hours.

After the reaction time elapsed, the supernatant was extracted, and the monosaccharide was analyzed by a DNS reducing sugar analysis method which is the same method as Example 2. As a result, 1.8 g of monosaccharide with respect to 4 g of the agarose was obtained at a yield of 45%.

In addition, as a result obtained by analyzing the amount of the acid component remaining in the monosaccharide preparation by a pH meter, the pH was 3, which confirmed that the acid component was included in the solution.

Comparative Example 3

Agarose and a monosaccharide were prepared by the same method as Example 2 except for using 5 g of the solid acid catalyst and 10 g of the agarose in a step of reacting the agarose with the solid acid catalyst in Example 2.

As an analysis result of the obtained product, yield of the monosaccharide with respect to 4 g of the agarose obtained from the seaweed was 40%.

The solid acid catalyst for preparing the monosaccharide by degrading agarose and the method of preparing the monosaccharide using the same according to the present disclosure are advantageous in that the solid acid catalyst is low-priced as compared to sulfuric acid in a liquid state, is re-usable after recovery, and is usable at a wide range of temperatures. Therefore, the solid acid catalyst has a relatively high environmental compatibility and economical feasibility. Further, since the solid acid catalyst does not separately require an additional separation process after being used, process is simplified.

What is claimed is:

1. A solid acid catalyst for preparing a monosaccharide by degrading agarose, the solid acid catalyst comprising:
    a particle including a carbonized chaff and a sulfonyl group, which is chemically bound on a surface of the carbonized chaff, and the particle has an average particle size of 100 to 500 nm.

2. The solid acid catalyst of claim 1, wherein the solid acid catalyst is a solid acid solution including a solid acid of 10 to 40 wt/volume % in water, based on a total amount of the solid acid and water.

3. The solid acid catalyst of claim 1, wherein the solid acid catalyst is prepared by carbonizing rice chaff at a temperature range of 550 to 700° C., immersing the carbonized chaff in an aqueous sodium hydroxide solution to form a sodium-silicate bond, introducing the sulfonyl group to replace sodium by treatment with a sulfonic acid, and treating with an acid solution.

4. A method of preparing a monosaccharide from agarose, the method comprising:
    obtaining the monosaccharide by degrading the agarose using a solid acid catalyst comprising a particle including a carbonized chaff and a sulfonyl group which is chemically bound on a surface of the carbonized chaff.

5. The method of claim 4, further comprising obtaining agar by treating seaweed with an alkaline aqueous solution and obtaining the agarose from the agar by using an solvent selected from the group consisting of organosulfur solvent and dimethylformamide, before obtaining the monosaccharide.

6. The method of claim 5, wherein the step of obtaining the agar by treating seaweed is performed by treating the seaweed with the alkaline aqueous solution and separating the agar in a viscous liquid with a solid and liquid separation method.

7. The method of claim 5, wherein the alkaline aqueous solution used in the step of obtaining the agar has a pH of 7.5 to 9.5.

8. The method of claim 5, wherein the step of obtaining the agar is performed at a temperature range of 95 to 130° C. for a reaction time of 30 minutes to 80 minutes.

9. The method of claim 5, wherein the seaweed includes a red algae selected from the group consisting of sea string, ceylon moss, glue plant, and laver.

10. The method of claim 5, wherein the seaweed is a pulverized material having a particle size of 100 to 300 micrometers obtained by drying and pulverizing the seaweed.

11. The method of claim 5, wherein, in the step of obtaining the agar, the seaweed and the alkaline aqueous solution are used in an amount of 0.01 to 0.04 g/mL.

12. The method of claim 5, wherein the organosulfur solvent is dimethylsulfoxide (DMSO).

13. The method of claim 5, wherein the step of obtaining the agar is performed at a temperature of 50 to 100° C. and the solvent selected from the group consisting of organosulfur solvent and dimethylformamide is added at a volume ratio of 2 to 5 times as a weight of the agar.

14. The method of claim 5, wherein the step of obtaining the agarose is performed by recovering a supernatant after treating the agar with the solvent selected from the group consisting of organosulfur solvent and dimethylformamide, precipitating the agarose by treating the recovered supernatant with acetone, and obtaining the precipitated agarose.

15. The method of claim 4, wherein a weight ratio of the agarose and the solid acid catalyst (agarose: solid acid catalyst) is 1:1 to 1:5.

16. The method of claim 4, wherein the step of obtaining the monosaccharide by degrading the agarose is performed at a reaction temperature range of 80 to 120° C. for a reaction time of 3 to 5 hours.

* * * * *